INTERCOMMUNICATING TELEPHONE WITH SECRECY ARRANGEMENT

Filed Sept. 6, 1968 2 Sheets-Sheet 1

INVENTOR.
LEOPOLD G. VLAMINCK

BY

James T. Whitesel

AGENT

Aug. 18, 1970 L. G. VLAMINCK 3,524,939

INTERCOMMUNICATING TELEPHONE WITH SECRECY ARRANGEMENT

Filed Sept. 6, 1968 2 Sheets-Sheet 2

United States Patent Office 3,524,939
Patented Aug. 18, 1970

3,524,939
INTERCOMMUNICATING TELEPHONE WITH SECRECY ARRANGEMENT

Leopold G. Vlaminck, Antwerp, Belgium, assignor to Automatic Electric Laboratories, Inc., Northlake, Ill., a corporation of Delaware Filed Sept. 6, 1968, Ser. No. 757,892
Int. Cl. H04m *1/08*
U.S. Cl. 179—17 6 Claims

ABSTRACT OF THE DISCLOSURE

A common talking circuit intercommunicating telephone system, wherein each telephone instrument includes a wall-mounted base and a handset. The handset comprises a receiver, transmitter, switchhook linkage, individual handset relay and a contact group. On a call from the main station to a desired telephone, the handset relay and a single relay common to the entire system are operated, with the handset relay locking itself operated and partially operating the associated contact group, and the common relay momentarily operating to open all other handset relay locking circuits to insure that none of these relays are operated. Removal of the handset of the called telephone allows the hook-switch linkage to completely operate the contact group for connecting the called telephone with the common talking circuit. Since none of the other handset relays are operated, removal of any of the other handsets only partially operates the contact group, and thus does not connect the handset circuit to the common talking circuit, thereby providing secrecy of the existing conversation.

BACKGROUND OF THE INVENTION

Field

This invention relates generally to telephone systems and more particularly to intercommunicating telephone systems as well as to telephone instruments, especially for such systems, adapted for use in apartment buildings, or the like, wherein an established call from a main station, or entrance, to an apartment telephone over a common talking circuit cannot be monitored by any of the other telephones in the system.

Prior art

Intercommunicating telephone systems for apartment buildings are known wherein all of the apartment telephones are connected in parallel to a common talking circuit and the removal of the handset of any telephone enables the user to either listen in on an existing conversation or take part in it.

By way of improvement of intercommunicating systems, such as mentioned above, there has further been proposed the inclusion of an individual, or station, relay at each apartment station, and a single control relay connected in and common to the entire system. In operation, a call button, or the equivalent, which identifies a desired telephone, is momentarily operated in the main station for causing operation of the station relay associated with the desired telephone and operation of an audible signal thereat, and also causing operation of the common relay. Both relays operate simultaneously, with the control relay opening a common holding circuit to restore any other station relay which may happen to be in an operated and locked condition as a result of a previous call to the corresponding telephone. When the button is released, the control relay restores to complete the common holding circuit for allowing the desired station relay to lock operated by way of its own locking contacts. Another set of station relay contacts in a series circuit including normally open hookswitch contacts are closed, whereupon removal of the handset closes the hookswitch contacts to complete the talking circuit with the main station. Secrecy is thereby provided, since removal of any of the other station handsets do not connect these stations to the talking circuit, because their station relays are not operated.

The known intercommunicating telephone systems of the last-mentioned type have the disadvantage that they consist of complicated individual pieces of equipment that are costly to manufacture and difficult to install and maintain.

Accordingly, it is an object of the present invention to provide an improved telephone intercommunicating system that is economical to manufacture, easy to install and maintain, and yet simple and dependable in operation.

Another object of the invention is to provide an improved telephone intercommunicating system including apparatus for insuring conversational secrecy to every connection established over a common talking circuit.

SUMMARY OF THE INVENTION

Briefly, in accordance with the present invention, the telephone instrument at each apartment, or station, includes a small wall-mounted base, or housing, and an associated handset assembly. A transmitter, receiver, handset relay, switchhook linkage and group of control contact springs are mounted within the handset, with the switchhook linkage and a linkage controlled by the relay armature each operatively connected to the contact spring group. In addition to providing means for mounting it to the wall, the base contains the conventional terminal block for connecting the handset conductors with the common talking circuit of the system. The base includes an outwardly extending rigidly mounted hook from which the handset is normally suspended, with the hook extending through an opening in the outer end of the switchhook linkage, and it further contains a single buzzer and push button, which are connected by way of the terminal block to the signaling circuit of the system.

The group of control contact springs comprise two sets of make contact springs, with the first spring in each set operable by an armature extension arm, or linkage, attached to the handset relay, and cam-shaped areas formed on the second springs in each set, which are engageable by teeth of a comb-shaped inner end portion of the switchhook linkage.

In the normal, or idle, condition of the telephone instrument, the handset, as indicated hereinbefore, is suspended from the base by placing the opening of the switchhook linkage over the handset hook of the base, and the handset relay is not operated. In the above, normal condition, the make contact springs of each set of the aforementioned group are biased away from each other, due to the handset relay not being operated to engage the first contact springs by the armature extension arm, and the cam areas of the second contact springs not being engaged by the comb teeth of the switchhook linkage, since the weight of the handset causes the linkage to be withdrawn from the handset to its extreme outward position.

When a call from the main station is received at the telephone instrument, the handset relay operates and, by means of its armature extension arm, moves the first springs in each set of the group toward, but not into engagement with their associated second springs. Upon removal of the handset, the switchhook linkage is permitted to move under the action of a bias spring into the handset, thereby causing the teeth of the aforementioned comb portion to engage the cam areas of the second springs and thus move them toward and into engagement with the first contact springs for effectively connecting the handset conductors to the common talking circuit.

As described above, the advantages of the telephone instrument of this invention reside in the arrangement of its component parts, whereby a relay, switchhook and combined contact spring group are all located in the handset. As arranged, the size of the handset is not increased and the space requirement of the base is reduced. Since separate contact spring pile-ups for the switchhook and relay are avoided, additional wiring and contact adjustment are eliminated, thereby improving circuit function and reliability.

DESCRIPTION OF THE DRAWINGS

The nature of the invention and its distinguishing features and advantages, which reside in the construction and arrangement and combination of parts thereof, will be more clearly understood from the following detailed description, taken in conjunction with the accompanying drawings, wherein.

DETAILED DESCRIPTION

Figures 1, 2, 3, 4:
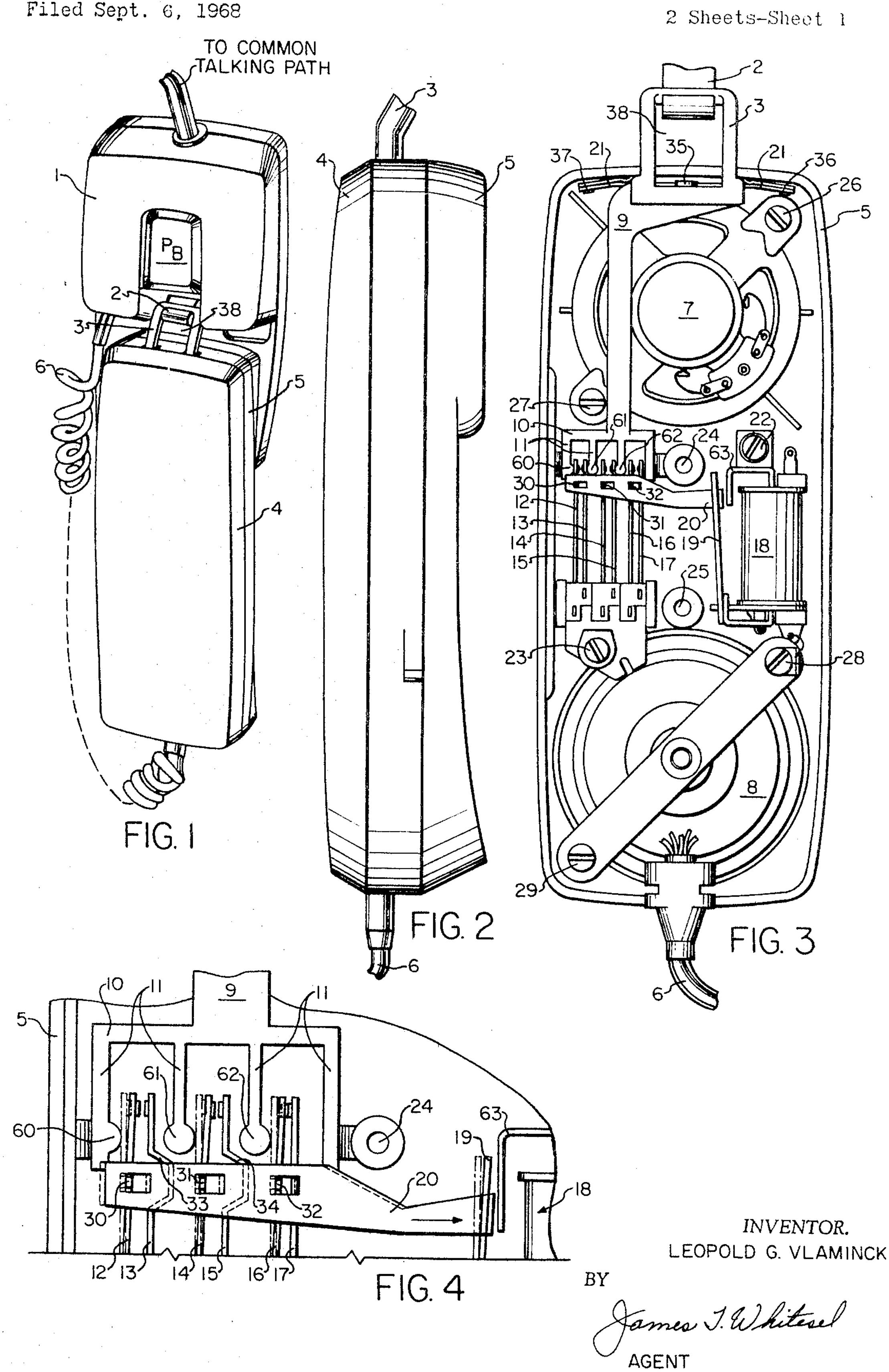
FIG. 1 is a perspective front view of the telephone instrument showing the handset suspended from the base.
FIG. 2 is a side view of the telephone handset.
FIG. 3 is a back view of the handset, with the rear cover removed, showing the details mounted therein.
FIG. 4 is an enlarged view of a portion of the handset, showing the control contact spring group, with only the handset relay operated.

Before proceeding with a detailed structural description of the invention, it is pointed out, with reference to FIG. 4 of the drawings, that the dotted portions of contact springs 12, 14, 16 and 17 represent the normal positions of these springs when the handset relay 18 and hence its armature linkage 20 are in their normal unoperated conditions. Similarly, in FIG. 5 the dotted portions of contact springs 13 and 15 represent the positions of these springs when switchhook linkage 9 is in its unoperated (normal) condition. Conversely, the solid portions of these springs represent their operated positions with the respective linkages are operated.

Referring now to the drawings, and in particular to FIGS. 1 through 5, the telephone instrument consists of a small wall-mountable base 1 and a handset having a rear cover 4 and a front housing 5, with the handset being electrically connected to base 1 by means of a cord 6. Stationary hook 2 is fixedly attached to base 1 and is used to suspend the handset therefrom, in which condition hook 2 extends through rectangular opening 38 in upper end 3 of switchhook linkage arm 9. As shown in FIG. 3, receiver 7, transmitter 8, switchhook linkage arm 9, relay 18 and contact springs 12, 13, 14, 15, 16 and 17 are all mounted within front housing 5 by means of brackets, screws or the like.

Figure 5:
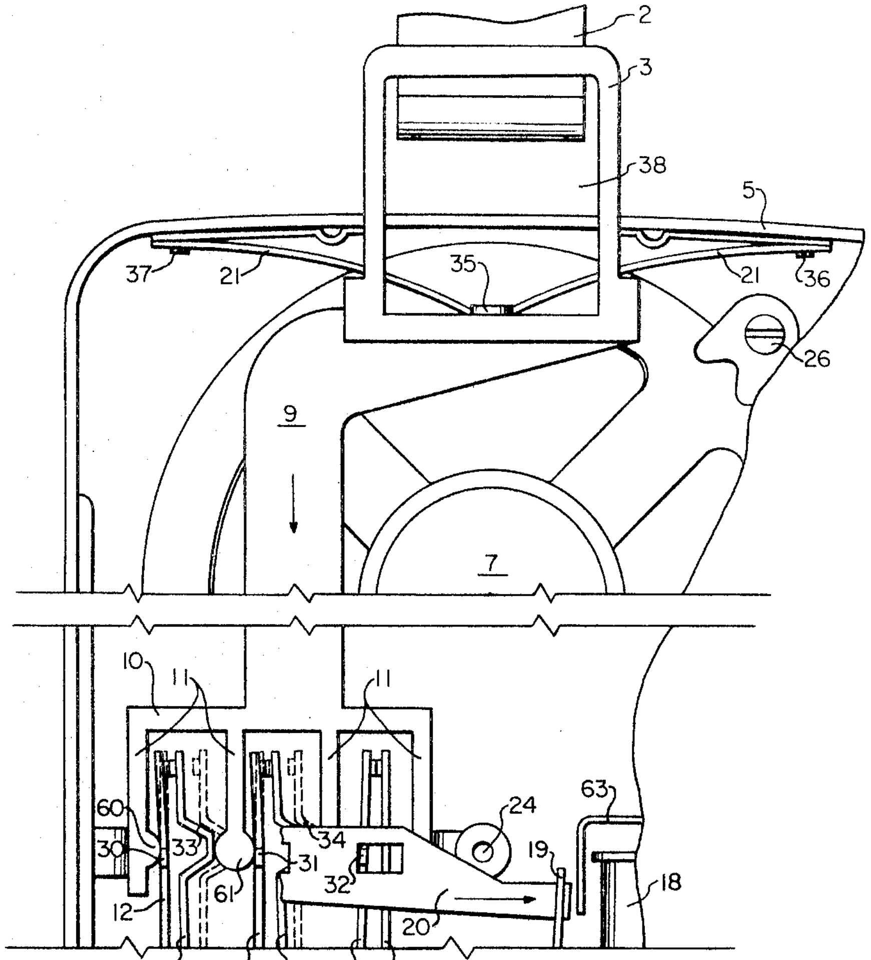
FIG. 5 is an enlarged view of a portion of the handset, showing the control contact spring group, with both the handset relay and the switchhook linkage operated.

As shown in FIGS. 3 and 5, switchhook linkage arm 9 is held in place at its upper end 3 by means of biasing spring 21, which is attached at each of its ends to front housing 5 by rivets 36 and 37, and at the middle to upper end 3 by rivet 35. Linkage arm 9 is held in position at its lower end 10 by comb teeth 11 forming a portion thereof, which are slidably positioned behind armature extension arm 20. Armature 19 is pivotally mounted at its lower end to relay 18 and lies in a plane substantially parallel to its core. Armature extension arm 20 is attached at the right-hand end to the upper end of armature 19 and extends to the left at right angles to the plane of the armature.

Left-hand contact springs 12, 14 and 16 of the contact spring group are normally biased against the right-hand edges of cam-shaped surfaces 60, 61 and 62, respectively, of the comb teeth 11 formed on lower end 10 of linkage arm 9. Springs 12, 14 and 16 have fingers 30, 31 and 32, respectively, which extend outwardly, that is, in a direction perpendicular to the plane of FIGS. 3, 4 and 5 and engage the left-hand edges of corresponding individual rectangular openings provided in extension arm 20.

Right-hand contact springs 13, 15 and 17 are so mounted that their contacts do not normally engage the contacts of left-hand springs 12, 14 and 16. Additionally, springs 13 and 15 have respective U-shaped cam portions 33 and 34 adapted to be engaged by the left-hand sides of the rounded cam-shaped surfaces 61 and 62, respectively of the two middle comb teeth 11.

As described in detail below, when a call from the main station is received at the telephone instrument, relay 18 and the buzzer (not shown) in base 1 are simultaneously operated. The buzzer sounds an audible signal and relay 18 magnetically attracts the upper end of armature 19, so that the associated extension arm 20 moves in the direction of the arrow toward pole piece 63 as shown in FIG. 4. Since fingers 30, 31 and 32 of springs 12, 14 and 16 are engaged by the left-hand edges of the individual rectangular openings in arm 20, springs 12, 14 and 16 are correspondingly moved in the same direction and by the same amount as arm 20. At this time, only the contacts of springs 16 and 17 are closed, while the contacts of springs 12 and 13, and 14 and 15 are still open.

No further operations take place until the party at the called station removes the handset from base 1 by lifting upper end 3 of the switchhook linkage arm 9 from the handset hook 2, at which time the biasing force of spring 21 causes linkage arm 9 to slide downward as indicated by the arrow in FIG. 5. Incidently to the downward movement of arm 9, the left-hand sides of the rounded cam surfaces 61 and 62 of the two middle comb teeth 11, respectively engage U-shaped cam portions 33 and 34 of springs 13 and 15 to move these springs to the left for completing closure of the respective contacts.

Figure 6:
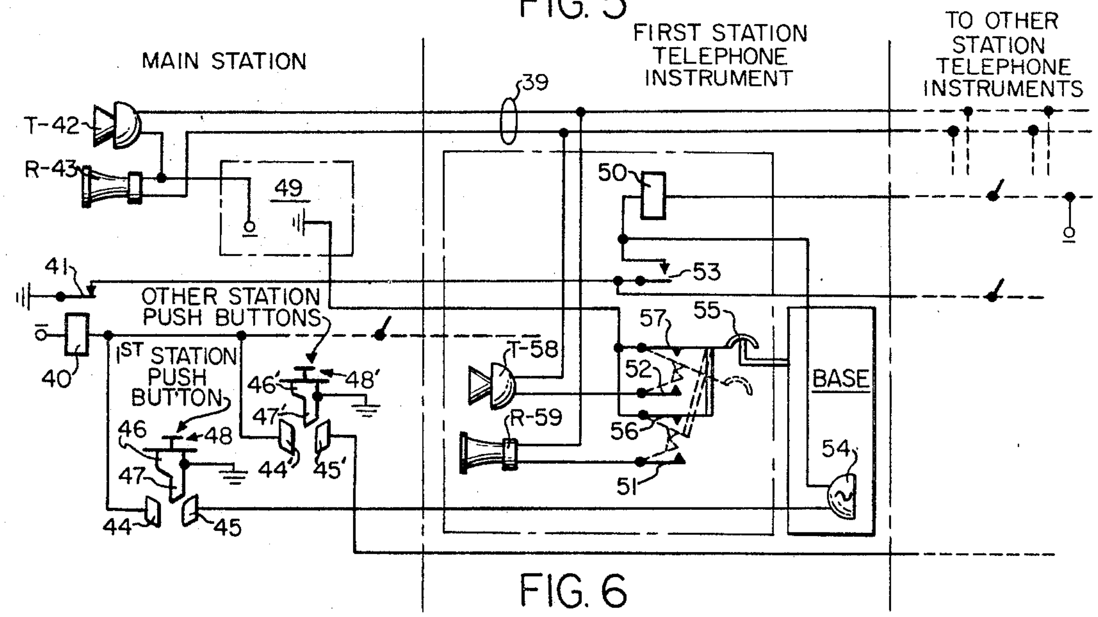
FIG. 6 is a simplified circuit diagram of an intercommunicating telephone system according to the invention.

A detailed description of the intercommunicating telephone system will now be given, reference being had to the simplified circuit shown in FIG. 6. It will be noted that push buttons 48 and 48', comprising a portion of the apparatus at the main station, may be of any suitable kind or type as long as the timing requirements of the circuits involved are met.

For the purpose of this description it will be assumed that the handset at the first telephone instrument is resting on switchhook 55 and that the calling party at the main station, upon desiring to signal the subscriber located at the first telephone instrument, has depressed push button 48. The depression of push button 48 first moves contact portion 47 into engagement with contact 45 to complete an obvious circuit for operating buzzer 54 in series with handset relay 50.

In operating, handset relay 50 moves, or operates, its switchhook contacts 51 and 52, which at this time only prepares for the connection of transmitter T58 and receiver R59 to the common talking circuit 39, and at contacts 53 prepares a point in its own locking circuit. As push button 48 is further depressed, contact portion 46 is moved into engagement with contact 44 to complete an obvious circuit for operating control relay 40. In operating, control relay 40 opens contacts 41 to open a common locking circuit for restoring the handset relay, similar to 50, which was operated as the result of the last previous call to one of the telephone instruments.

When push button 48 is released, contact portion 46 disengages from contact 44 for opening the operating circuit and allowing control relay 40 to restore. The restoring of control relay 40 recloses contacts 41, thereby completing the common locking circuit to lock handset relay 50 of the first instrument. As push button 48 further restores, contact portion 47 disengages from contact 45 to open the previously mentioned series circuit to buzzer 54 and handset relay 50. Handset relay 50, however, will remain locked operated by way of its closed contacts 53 and the closed contacts 41 of control relay 40.

The called subscriber at the first telephone instrument removes the handset from switchhook 55 in response to the audible signal from buzzer 54, whereby hookswitch contacts 56 and 57 are moved to engage operated relay contacts 51 and 52. Transmitter T58 and receiver R59 are thus connected with the common talking circuit 39 for allowing the calling party at the main station to converse with the party at the first instrument to he exclusion of any other party of the system. Talking battery is thereafter provided to the common talking circuit 39 from supply 49.

What is claimed is:

1. A telephone instrument having a wall-mountable base and a handset; said base having a stationary hook mounted thereon; said handset including a relay, a switchhook mounted on said handset for movement relative thereto, and interacting first and second sets of normally open contact springs; said relay having an armature assembly engaging said first set of contact springs for actuating said first set in the direction of said second set when said relay is operated; said switchhook having means at one end engageable with said stationary hook for normally suspending said handset therefrom; bias means moving said switchhook relative to said handset from an on-hook to an off-hook position when said handset is removed from said stationary hook; and means at the other end of said switchhook engageable with said second set of contact springs in response to said movement of said switchhook to said off-hook position for actuating said second set of contact springs in the direction of said first set so that said first and second sets are brought into mutually contacting engagement only when said relay is operated and said switchhook is in said off-hook position.

2. A telephone instrument in accordance with claim 1, wherein each contact spring of said first set includes a finger extending outwardly therefrom; and wherein said armature assembly includes an individual rectangular shaped opening for receiving each said finger; whereby said relay operation is transferred by way of said armature assembly to said first set of contact springs.

3. A telephone instrument in accordance with claim 1, wherein each contact spring of said second set includes a cam portion; and wherein said other end of said switchhook comprises corresponding individual comb teeth, each having a cam surface, for engaging the cam portion of the corresponding contact spring of said second set; whereby said movement of said switchhook to said off-hook position is transferred to said second set of contact springs.

4. A telephone instrument in accordance with claim 1, wherein said bias means for moving said switchhook to said off-hook position comprises a biasing spring mounted within said handset and engageable with both said handset and said switchhook.

5. In an intercommunicating telephone system of the type having a main station and a plurality of substations all connected by a common talking circuit, said main station having selective calling means and each said substation comprising a handset with a transmitter and a receiver, a relay having an armature and being operable in response to the actuation of the corresponding calling means at said main station, a hookswitch actuating member operable upon removal of the handset at said substation, and means for connecting the handset of the calling substation to said common talking circuit only upon operation of both said relay and said hookswitch member, thereby to safeguard secrecy of conversation, the improvement that at each said substation both said relay and said hookswitch member are mounted in said handset, said hookswitch member being movable relative to said handset when said handset is lifted, and that said connecting means comprise a plurality of pairs of normally open contact springs, one spring of each pair being mounted for engagement by said relay armature and the other spring of each pair being mounted for engagement by said hookswitch member and the springs of each pair being moved into contacting engagement only upon joint operation of said relay and said hookswitch member in said handset.

6. The improvement in an intercommunicating telephone system as claimed in claim 5 and wherein said relay also has a normally open locking contact, said locking contact being linked solely to said relay armature so as to be closed upon operation of said relay regardless of the position of said hookswitch member.

References Cited

UNITED STATES PATENTS

| | | | |
|---|---|---|---|
| 1,056,425 | 3/1913 | Johnson | 179—17 |
| 2,945,107 | 7/1960 | Hufnagel | 335—135 |

FOREIGN PATENTS

| | | |
|---|---|---|
| 653,639 | 5/1951 | Great Britain. |
| 271,896 | 9/1963 | Australia. |

KATHLEEN H. CLAFFY, Primary Examiner

J. S. BLACK, Assistant Examiner

U.S. Cl. X.R.

179—38, 159, 167